May 3, 1955 W. C. RICE 2,707,592
POCKET CALCULATOR FOR THE CALCULATION OF CALORIES
Filed Nov. 30, 1953
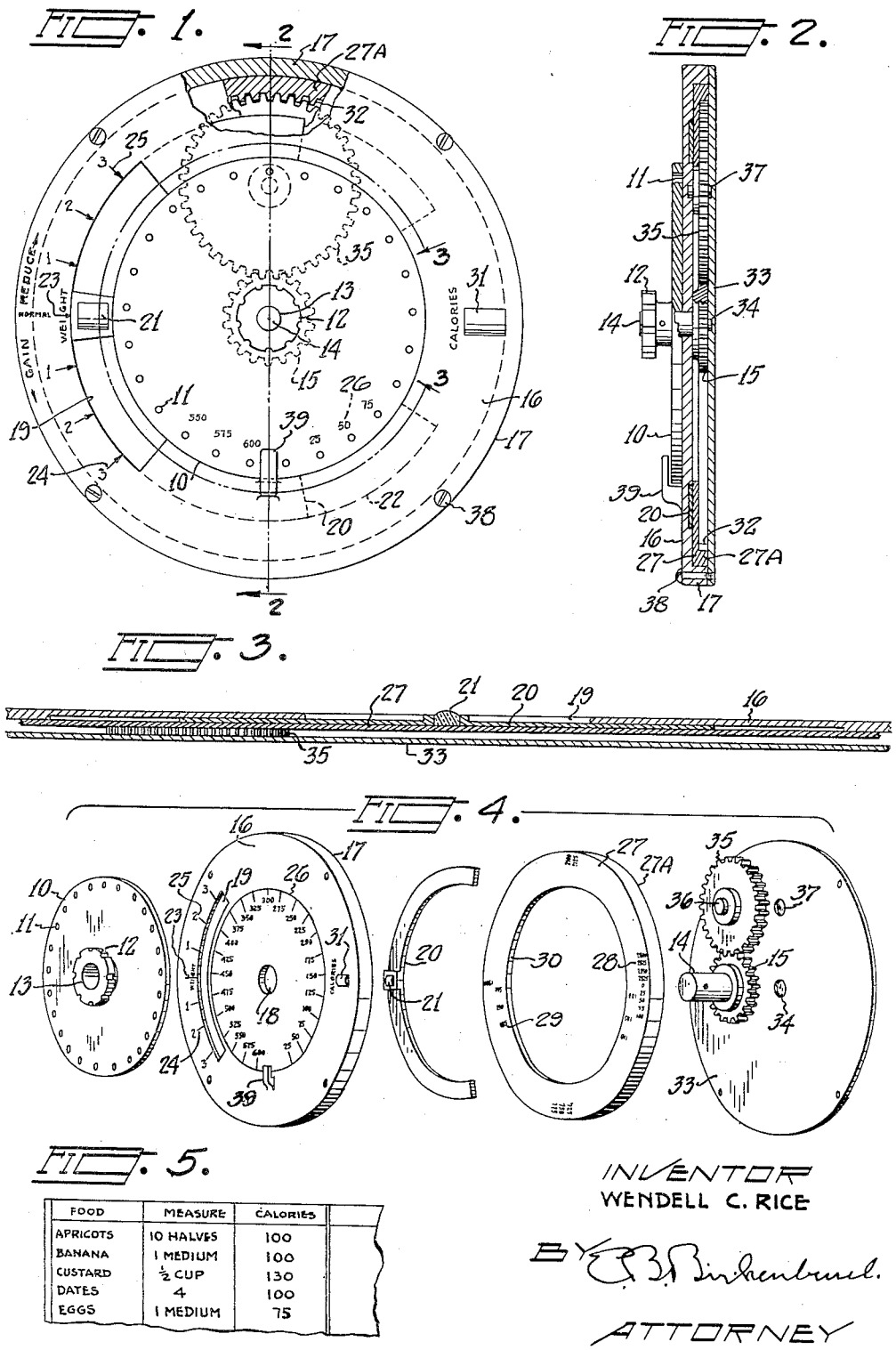
INVENTOR
WENDELL C. RICE
ATTORNEY

United States Patent Office 2,707,592
Patented May 3, 1955

2,707,592

POCKET CALCULATOR FOR THE CALCULATION OF CALORIES

Wendell C. Rice, Coulee Dam, Wash.

Application November 30, 1953, Serial No. 395,095

5 Claims. (Cl. 235—78)

This invention relates generally to pocket calculators and particularly to one adapted to the calculation of calories.

The main object of this invention is to provide a pocket calculator by means of which a person selecting a meal can easily determine the total calories involved in a certain group of foods of one helping of each kind of food in order to enable him to remain within his maximum calorie requirements.

I accomplish this and other objects in the manner set forth in the following specifications as illustrated in the accompanying drawing, in which Fig. 1 is a plan of the device.

Fig. 2 is a section taken along the line 2—2 in Fig. 1.

Fig. 3 is a development of a section taken along the line 3—3 in Fig. 1, with some of the structure omitted for sake of clarity.

Fig. 4 is an expanded view showing the parts in perspective.

Fig. 5 is a fragmentary view of a chart showing the number of calories in an average helping of different foods.

Referring in detail to the drawing there is shown a manually operated dial 10 of transparent material and provided with twenty-five holes 11 around the outer edge of the dial, into which holes may be inserted a pencil point for the purpose of rotating the dial 10.

The dial 10 also has a hub 12 and a central hole 13 in which is pinned the shaft 14 on which is mounted a pinion 15. Against the dial 10 is placed the casing 16 having a wide flange 17 around its outer edge. A hole 18 is formed at the center of the casing 16 for the shaft 14.

In the casing 16 is formed the arcuate slot 19 within which is a runner 20 containing a magnifying lens 21. The runner 20 is mounted in a circular groove 22 in casing 16. The slot 19 has a central weight mark 23, on each side of which are the calibrations 24 and 25, indicating the position at which the runner 20 should be set for a correct reading; that is, if the aim is to reduce or gain weight in which event the runner 20 will be moved accordingly and left there until a change in the weight trend is desired.

On the face of the casing 16 is printed a dial 26, indicating the number of calories per portion of food, the largest calorie count of the common foods being not more than 600 calories per portion. Within the casing flange 17 is a dial ring 27, on the face of which are indicated calorie values 28, which in this illustration employs 25 as an increment, the total indicated being 3600 calories.

Weight values 29 are indicated around the central opening 30 and represent the weight of the individual, while the numbers 28 indicate the corresponding calorie requirement for an individual of the weight indicated at the numbers 29.

In the casing 16 is disposed a lens 31, which is directly over the numbers 28 while the lens 21 is directly over the weight numbers 29.

Within the flange 27–A is formed the internal gear 32.

The back 33 is a flat disk having a central recess 34 which forms a journal for the shaft 14.

An idler gear 35 meshes with the pinion 15 and the internal gear 32. The stub shaft 36 of the gear 35 journals in the recesses 37 in the back 33 and the casing 16. Screws 38 hold the casing 16 and back 33 together.

On the casing 16 is disposed a fixed stop 39 which limits the travel of the dial 10 in either direction for reasons which will be made apparent.

In the present instance, which is only illustrative, the device is shown as being calibrated with a value of 25 calories per station on the manual dial 10 and 24 stations printed on the casing visible through the transparent dial 10. One station is occupied by the stop 39.

Since the gear ratio between the manual dial 10 and the registering dial whose numbers 28 are printed on the casing 16 is 1–6 and one revolution of the dial 10 is equal to 600 calories, then the numbers 28 on the ring 27 can run from zero to 3600 calories, using an increment of 25. Obviously, these values may be changed without departing from the spirit of this invention.

Since one of the objects of this invention is to enable the user to ascertain how much of this allotment of calories has been consumed, either by the meal or day, he needs first to turn the dial until his weight number 29 appears in the lens 21. If, for example, his weight is one hundred pounds, he will find by looking through the lens 31 that his daily calorie allotment is 1500. He then starts out his day of eating by setting the register dial 28 to zero. Then, when selecting his meal, he refers to the chart, shown in part in Fig. 5, and, if he orders a helping of apricots, he merely inserts his pencil in the hundred station and pulls the manual dial 10 to the stop 39 and makes a record visible through the lens 31; namely, 100 calories. Other items are registered and the total always appearing in plain sight.

Obviously other ways of making the record may be employed. The movable lens 21 is used to enable one to add or subtract from the normal amount indicated to assist those who wish to add weight or reduce it.

I claim:

1. An adding device having in combination a circular casing having disposed thereon a circular calorie scale covering a maximum of food, a transparent manual dial revolvably mounted in front of said calorie scale, said manual dial having a plurality of holes formed around same constituting stations for the operation of said dial, a geared dial ring behind said casing concentric with said manual dial, said ring having a scale of calorie values displayed around the outer edge thereof and a scale of man-weight values disposed around the inner edge thereof, said casing having viewing lenses mounted therein, registering with said inner and outer scales, and reduction gearing between said manually operated dial and said geared ring and a back for said casing, supporting said reduction gearing.

2. An adding device comprising a casing, a geared rotatable dial mounted behind said casing, a manually operated dial mounted in front of said casing, a shaft for said manual dial, a reduction between said shaft and the gearing on said revolvable dial, said revolvable dial having weights and calorie scales thereon, said casing having openings therein registering with the scales on said revolvable dial, and means for adjusting the circular position of the opening in front of the weight scale.

3. An adding device composed of a stationary casing having a circular dial graduated in calories covering a maximum single helping of 600 calories, a dial ring mounted in said casing concentric with said circular dial and having an internal gear, said dial ring having an outer scale of calorie values and having an inner scale showing man-weight in pounds, a shaft journalling along the axis of said dials, one end of said shaft journalling within the casing having a pinion thereon, an intermediate gear between said pinion and said internal gear, said shaft having an actuating dial on its outer end divided into a plurality of stations, and said casing having windows therein registering with the dials on said dial ring.

4. An adding device as described in claim 3 characterized by having one of said windows adjustable in a circular direction to add or subtract from the requirements in calories for the purpose of gaining or losing weight.

5. An adding machine for calorie consumption having in combination a pair of sets of calibrations on a geared movable dial, a fixed casing having a window in line with each set of calibrations whereby the daily caloric requirement may be determined for an individual of a given weight, a manually operated dial having holes formed in its circumference forming stations having an increment value of approximately twenty-five calories, said casing having a stop thereon whereby said manual dial may be stopped after registering the calories in a single helping of food, a shaft on which said manual dial is mounted, and reduction gearing between said shaft and the gear on said movable dial.

No references cited.